Aug. 11, 1931.   G. A. HANDY   1,818,950
BREAKER STRIP
Filed Aug. 9, 1929

Inventor
George A. Handy.
By
Attorney

Patented Aug. 11, 1931

1,818,950

UNITED STATES PATENT OFFICE

GEORGE A. HANDY, OF AKRON, OHIO, ASSIGNOR TO THE GOODYEAR TIRE & RUBBER COMPANY, OF AKRON, OHIO, A CORPORATION OF OHIO

BREAKER STRIP

Application filed August 9, 1929. Serial No. 384,719.

This invention relates to pneumatic vehicle tires and it has particular relation to a breaker strip which is interposed between the carcass of a tire of this type and the tread band thereof.

An object of the invention is to provide a breaker strip for pneumatic vehicle tires comprising a combination of resilient elements that is more efficient than those previously employed.

According to the present practice, pneumatic tire casings comprise a body portion formed of superimposed plies of rubberized fabric, a rubberized fabric breaker strip applied centrally to the outer surface of the body portion, and a rubber tread. Failure of such tires is often caused by cracks which occur in the carcass resulting from the inability of the breaker strip to distribute the shocks received when the tire is in service. This difficulty is more pronounced in tire casings of relatively light construction such, for example, as balloon tires and particularly in the larger sizes of such tires. The rubber in a breaker strip of such a tire has considerably more stretch than that of the reinforcing cords and when sustaining a severe shock, the rubber pulls away from the cord reinforcing elements, thereby localizing the shock at the point of contact whereby both the breaker strip and the plies of the tire are injured.

In this invention, a breaker strip composed wholly of rubber, including rubber strands, is employed to provide the elasticity necessary to distribute the shocks received when the tire is in service, to protect the plies of the carcass and prevent breaker fracture.

Figure 1:
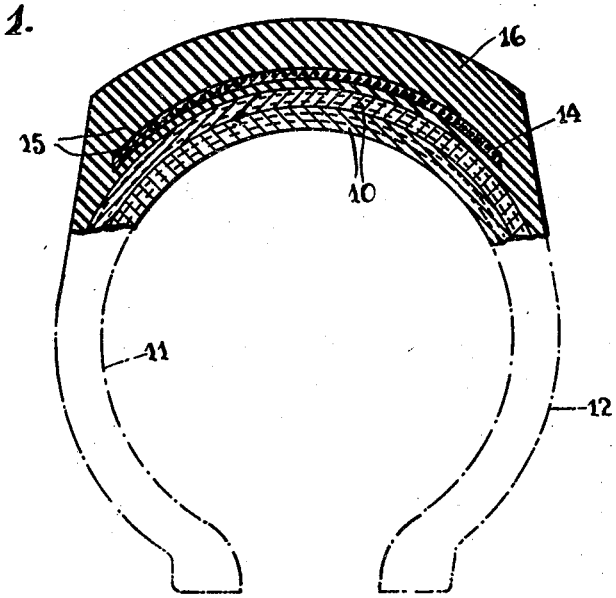
Figure 2:
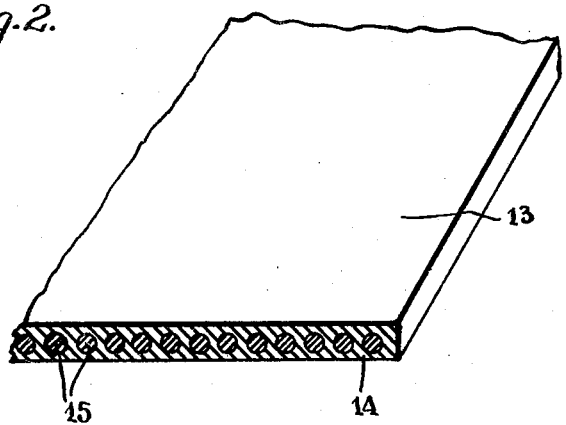

For a better understanding of the invention, reference may now be had to the accompanying drawings, in which:

Fig. 1 is a cross-sectional view of a tire constructed in accordance with my invention; and Fig. 2 is a fragmentary perspective view of a breaker strip constructed in accordance with my invention.

In the embodiment of the invention illustrated in the accompanying drawings, a plurality of plies 10 of rubberized cord fabric constitute the body portion 11 of a pneumatic tire 12. A breaker strip 13 comprising a comparatively soft rubber web 14 and reinforcing rubber strands 15 of a comparatively hard rubber compound is applied circumferentially of the exterior of the body portion 11. A tread 16 is assembled in the usual manner exteriorly of the body 11 and breaker strip 13.

The elasticity of the rubber reinforcing strands 15 is similar to that of the rubber web 14 and when the tire sustains a severe shock, the rubber web will not pull away from the rubber reinforcing elements; whereas in a breaker strip composed of cord reinforcing elements and rubber, the rubber is often stripped from the cords. While the elongation of the rubber web of a breaker strip of this invention and the web of a breaker strip of the prior construction are substantially the same when a shock of equal force is exerted thereon, the elongation of the rubber reinforcing elements in a breaker strip of this construction is substantially 50% more than that of a breaker strip having cord reinforcing elements. Cord reinforcing elements ordinarily employed are considerably restricted with reference to elasticity and elongation whereas the rubber elements employed in a breaker strip of this invention provide for great variation in elasticity and elongation of the strips according to the kind of breaker strip desired.

From the foregoing description, it will be apparent that I have provided a breaker strip for a tire that will obviate not only injuries, such as those occurring in the breaker strips of prior constructions but it will also obviate the pulling away of the web from the reinforcing elements thereby preventing early tire failure.

Although I have illustrated only one form which the invention may assume and have described that form in detail, it will be apparent to those skilled in the art that the invention is not so limited but that various modifications may be made therein without departing from the spirit of the invention or from the scope of the appended claims.

What I claim is:

1. A breaker strip for a pneumatic tire comprising a rubber web having rubber reinforcing elements of a less extensible compound therein.

2. A breaker strip for a pneumatic tire comprising a rubber web having rubber reinforcing elements of a less extensible compound in parallel relation therein.

3. A breaker strip for a pneumatic tire comprising a web of comparatively soft rubber compound, and reinforcing strands of a comparatively hard rubber compound therein.

4. A breaker strip for a pneumatic tire comprising a rubber web of comparatively soft rubber compound and reinforcing strands of a comparatively hard rubber compound in parallel relation therein.

5. A breaker strip for pneumatic tires comprising a plurality of hard rubber threads in parallel relation and bonded together with a soft rubber compound.

In witness whereof, I have hereunto signed my name.

Signed at Akron, in the county of Summit and State of Ohio, U. S. A., this 8th day of August, 1929.

GEORGE A. HANDY.